(12) United States Patent
Zhang et al.

(10) Patent No.: US 11,370,978 B2
(45) Date of Patent: Jun. 28, 2022

(54) METHOD AND APPARATUS FOR INTEGRATING PRESSURIZED HYDROCRACKING OF HEAVY OIL AND COKE GASIFICATION

(71) Applicant: CHINA UNIVERSITY OF PETROLEUM—BEIJING, Beijing (CN)

(72) Inventors: Yuming Zhang, Beijing (CN); Jinsen Gao, Beijing (CN); Xingying Lan, Beijing (CN); Chengxiu Wang, Beijing (CN); Xiaogang Shi, Beijing (CN)

(73) Assignee: CHINA UNIVERSITY OF PETROLEUM-BEIJING, Beijing (CN)

(*) Notice: Subject to any disclaimer, the term of this patent is extended or adjusted under 35 U.S.C. 154(b) by 105 days.

(21) Appl. No.: 17/028,896

(22) Filed: Sep. 22, 2020

(65) Prior Publication Data

US 2021/0087478 A1 Mar. 25, 2021

(30) Foreign Application Priority Data

Sep. 23, 2019 (CN) .......................... 201910900583.6

(51) Int. Cl.
*C10G 47/02* (2006.01)
*C10G 69/02* (2006.01)
(Continued)

(52) U.S. Cl.
CPC .......... *C10G 47/02* (2013.01); *B01J 8/1863* (2013.01); *C01B 3/02* (2013.01); *C10G 69/02* (2013.01);
(Continued)

(58) Field of Classification Search
CPC ........ C10G 47/00; C10G 47/02; C10G 69/02; B01J 8/005; B01J 8/18; B01J 8/1827; B01J 8/1863

See application file for complete search history.

(56) References Cited

U.S. PATENT DOCUMENTS

| | | | | |
|---|---|---|---|---|
| 3,779,893 A | * | 12/1973 | Leas | ...................... C10G 1/083 208/417 |
| 4,213,848 A | | 7/1980 | Saxton | |
| 4,511,459 A | * | 4/1985 | Yan | .......................... C10G 9/32 208/50 |

FOREIGN PATENT DOCUMENTS

| | | |
|---|---|---|
| CN | 1504404 A | 6/2004 |
| CN | 101451073 A | 6/2009 |

(Continued)

OTHER PUBLICATIONS

The first Office Action of CN application No. 201910900583.6.

*Primary Examiner* — Renee Robinson
(74) *Attorney, Agent, or Firm* — J.C. Patents

(57) ABSTRACT

The present disclosure provides a method and an apparatus for integrating pressurized hydrocracking of heavy oil and coke gasification. A coupled reactor having a cracking section and a gasification section is used in the method: a heavy oil feedstock and a hydrogenation catalyst are fed into a cracking section, to generate light oil-gas and coke; the coke is carried by the coke powder into the gasification section, to generate syngas; a regenerated coke powder is returned to the cracking section; the syngas enters the cracking section and merges with light oil-gas, and enters a gas-solid separator, to separate out first-stage solid particles and second-stage particles in sequence, and a purified oil-gas product is collected; oil-gas fractionation of the purified oil-gas product is performed, and a light oil product and a (Continued)

syngas product are collected. Yield and quality of the light oil can be improved by the method.

14 Claims, 3 Drawing Sheets

(51) Int. Cl.
  *B01J 8/18* (2006.01)
  *C01B 3/02* (2006.01)
(52) U.S. Cl.
  CPC ..... *C10G 2400/02* (2013.01); *C10G 2400/04* (2013.01); *C10G 2400/22* (2013.01)

(56) References Cited

FOREIGN PATENT DOCUMENTS

| | | |
|---|---|---|
| CN | 102115675 A | 7/2011 |
| CN | 102234534 A | 11/2011 |
| CN | 102965138 A | 3/2013 |
| CN | 103224808 A | 7/2013 |
| CN | 108587674 A | 9/2018 |

* cited by examiner

METHOD AND APPARATUS FOR INTEGRATING PRESSURIZED HYDROCRACKING OF HEAVY OIL AND COKE GASIFICATION

CROSS-REFERENCE TO RELATED APPLICATIONS

This application claims the priority benefit of China Patent Application No. 201910900583.6 filed on Sep. 23, 2019, the content of which is hereby incorporated by reference in its entirety.

TECHNICAL FIELD

The present disclosure relates to heavy oil upgrading processing technologies and, in particular, to a method and an apparatus for integrating pressurized hydrocracking of heavy oil and coke gasification.

BACKGROUND

Heavy oil is a residue remaining after crude oil is fractionated to extract gasoline, kerosene and diesel; in addition, there are abundant resources of heavy oil in the stratum. The heavy oil has characteristics of heavy components, low hydrogen/carbon ratio and the like, and generally has higher content of sulfur, nitrogen, heavy metals and high carbon residue value either. With the continuous exploitation of the crude oil, problems that the crude oil becomes heavier in component and inferior in quality are increasingly serious, along with the increasingly stringent environmental protection regulations, how to perform heavy oil upgrading processing to convert the heavy oil into qualified cleaned oil products, such as gasoline, diesel, liquefied gas and the like, is a main challenge facing petroleum processing enterprises at present.

In the current stage, processing routes of the heavy oil can be roughly classified into two types: hydrogenation and decarbonization. Where, hydrogenation increases the hydrogen-to-carbon ratio via reactions of the heavy oil and hydrogen. Because of high carbon residue value and high contents of heavy metal and heteroatom of the heavy oil, a large amount of hydrogen is usually required if hydrocracking is directly adopted, where high pressure and a high-efficiency catalyst are likely required either, which makes it relatively difficult to implement the process. Besides, because the heavy oil has a low hydrogen/carbon ratio, a shortage of hydrogen during the heavy oil upgrading process usually becomes more acute.

The decarbonization processing generally is redistribution of the hydrocarbon resources of feedstocks in products. Currently, commonly used decarbonization technologies at home and abroad mainly include processes of catalytic cracking and delayed coking. Where the catalytic cracking process usually causes rapid carbon deposition on the catalyst or poisoning deactivation of catalyst, and a relatively large amount of coke is generated during the catalytic cracking process of the heavy oil. If a conventional coking method is used to regenerate the catalyst, a large amount of external heat is usually required, which is also a great waste of carbon resources to some extent. The delayed coking process has better feedstock adaptability due to no catalyst involved. However, a large amount of solid coke is generated as a by-product of the delayed coking process, while measures have been taken to restrict high-sulfur coke with a sulfur content higher than 3% to exit the factory according to the latest environmental protection requirements, thus, application of the delayed coking process is limited.

In view of the advantages and disadvantages of the abovementioned hydrogenation and decarburization, it has become a choice for many petroleum processing enterprises to crack the heavy oil into light oil products firstly and then perform the hydrogenation processing to the light oil products to obtain qualified products.

CN1504404A discloses a process for integrating oil refining and gasification. Petroleum hydrocarbons firstly contact and react with a coke transfer agent in a reactor, with oil-gas entering a subsequent product separation system, and a coke transfer agent for coke deposition is sent to a gasifier to react with vapor and oxygen-containing gas, to generate syngas and implement regeneration of the coke transfer agent for coke deposition. Regenerated coke transfer agent is returned to a cracking section for recycling. The disclosure realizes the integrating of two processes of oil refining and gasification, and the process is similar to a catalytic cracking process, where a coke gasification process is adopted to replace a conventional coking regeneration process.

CN102234534A discloses a method for processing inferior heavy oil. In the method, a heavy oil cracking reaction is carried out firstly, where a low-activity contact agent is selected, and after the reaction, a carbon deposition contact agent is sent to different reaction areas of a gasification section for combustion or gasifying regeneration, a semi-regeneration agent and a second-stage regeneration agent with different carbon contents are obtained, respectively. A multi-stage regeneration reaction in the reactor increases difficulties in operations to the process to some extent.

CN102115675A discloses a method and an apparatus for heavy oil upgrading processing. Feedstock oil firstly reacts with a solid heat carrier in a thermal cracking reactor to obtain a light oil-gas product. The solid heat carrier with heavy coke attached to its surface enters a combustion (gasification) reactor through a refeed valve to remove the coke on the surface. After regeneration, the solid heat carriers are with a high-temperature partially returned to the thermal cracking reactor through a distribution valve and serve as reaction bed material.

CN102965138A discloses an integrating process of double-reaction-tube semi-coke circulating bed thermal cracking of heavy oil and gasification, proposing to use a downer reaction tube for heavy oil cracking to obtain a light oil-gas product. After coking, the semi-coke enters a riser gasification reactor to carry out a gasification reaction with an oxidant and water steam to generate syngas, and after the reaction, high-temperature semi-coke flows into a material returning apparatus to be cycled, providing heat required for reactions of the heavy oil.

In the above methods, the heavy oil cracking and the gasification or combustion of coke are mainly used to implement the heavy oil upgrading, and thereby obtaining products, such as oil-gas, syngas and the like. However, by adopting above methods, both of the yield and the quality of light oil products are relatively low.

SUMMARY

Directing at the abovementioned drawbacks, the present disclosure provides a method for integrating pressurized hydrocracking of heavy oil and coke gasification, which can improve the yield and the quality of light oil products.

The present disclosure further provides an apparatus for integrating pressurized hydrocracking of heavy oil and coke gasification, which is used to implement the abovementioned method, to improve the yield and the quality of light oil products.

For the abovementioned purpose, a first aspect of the present disclosure provides a method for integrating pressurized hydrocracking of heavy oil and coke gasification, where a coupled reactor having a cracking section and a gasification section that are internally connected with each other is used as a reactor, the method includes the following steps:

feeding a heavy oil feedstock and a hydrogenation catalyst into the cracking section in an upper portion of the coupled reactor, and in the presence of hydrogen, the heavy oil feedstock is contacted with a coke powder in a fluidized state to carry out a pressurized catalytic cracking reaction under catalysis of the hydrogenation catalyst to generate light oil-gas and coke;

carrying the coke downward by the coke powder into the gasification section in a lower portion of the coupled reactor, and carrying out a gasification reaction with a gasification agent to generate syngas and regenerate the coke powder; where obtained a regenerated coke powder is returned to the cracking section; the syngas goes upward in the coupled reactor into the cracking section to merge with the light oil-gas, and is guided out from the coupled reactor to a gas-solid separator;

subjecting the light oil-gas and the syngas in the gas-solid separator to a first-stage gas-solid separation and a second-stage gas-solid separation sequentially, first-stage solid particles and second-stage particles are separated out in sequence, and a purified oil-gas product is collected, and the first-stage solid particles are returned to the cracking section to form a first-stage circulation; and the second-stage solid particles are returned to the gasification section to carry out a gasification reaction and form a second-stage circulation; and performing oil-gas fractionation to the purified oil-gas product, and a light oil product and a syngas product are collected.

According to technical solutions provided in the present disclosure, the heavy oil feedstock and the hydrogenation catalyst are fed into the cracking section in the upper portion of the coupled reactor to contact with the coke powder in a fluidized state, and the pressurized catalytic hydrocracking reaction is carried out to obtain the light oil-gas and the coke. The coke is attached on the surface of the coke powder. Except for part of the coke powder that leaves the cracking section upward after coking, carbon-deposited coke powders with relatively large particle size (which may carry a small amount of the hydrogenation catalyst) go downward into the gasification section by gravity, or is transported to the gasification section for the gasification reaction, thereby obtaining the syngas while achieving the regeneration of the coke powder.

The regenerated coke powder is returned to the cracking section to be recycled as a reaction bed material and to provide part of the heat required for the pressurized catalytic hydrocracking reaction. The syngas goes upward in the coupled reactor into the cracking section, which on one hand, providing the heat required for the pressurized catalytic hydrocracking reaction and facilitating the fluidization of the coke powder in the cracking section, and on the other hand, can provide a hydrogen-rich reaction atmosphere required for the heavy oil cracking by active components abundant in the syngas, such as hydrogen, which can interact with the newly produced high-activity light oil-gas to suppress a coking reaction in the process of the heavy oil cracking, and thereby improving the yield and the quality of the light oil products.

The syngas entering the cracking section merges into the light oil-gas (where the syngas and the light oil-gas are collectively referred to as a high-temperature oil-gas), the high-temperature oil-gas carries the coke powder particles and the hydrogenation catalyst which have relatively small particle size upward, and is guided out from the coupled reactor into the gas-solid separator.

Specifically, the high-temperature oil-gas undergoes two stages of gas-solid separations in the gas-solid separator, where in the process of the first-stage gas-solid separation, the first-stage solid particles are separated out by removing the coarse particles carried in the high-temperature oil-gas; in the process of the second-stage gas-solid separation, the second-stage solid particles are separated out by removing the fine particles carried in the high-temperature oil-gas. Where, the first-stage solid particles with a larger particle size are returned to the cracking section to form the first-stage circulation, and the first-stage solid particles may be served as a reaction bed material, and provide a place required for a gas-solid reaction and part of the heat required for the cracking process; the second-stage solid particles with a smaller particle size are returned to the gasification section, where they can be rapidly regenerated and converted into syngas and regenerated coke powder.

The purified oil-gas product collected from the gas-solid separator may be further passed through systems, such as a gas-fluid fractionating tower, an oil-gas absorption and stabilizer tower and the like, to obtain a gas product, such as syngas, dry gas, liquefied gas and the like, and a light oil product, respectively. Certainly, the obtained light oil product may be further separated to obtain liquid products with different distillation range components, where the syngas may be served as a hydrogen source of a refinery; and the heavy oil may be mixed with the heavy oil feedstock for refining.

Therefore, in the present disclosure, by integrating the cracking section and the gasification section into the same coupled reactor, the coke generated in the heavy oil cracking serves as a reactive material of the gasification section. And the gasification reaction in the gasification section produces a high-quality syngas and implements regeneration of the coke powder. The regenerated coke powder is returned to the cracking section for recycling and to provide part of the heat. And the high-quality syngas goes upward into the cracking section, which not only can provide heat, but also provide a feedstock for an upgrading reaction of the heavy oil, or can be used a hydro-upgrading reaction of an oil product. And the high-quality syngas also provide a hydrogen-containing atmosphere for a heavy oil cracking reaction, which, together with the hydrogenation catalyst, can inhibit the coking reaction in the process of the heavy oil cracking and improve the upgrading degree of the heavy oil feedstock, thus improving the yield and the quality of the light oil product.

Thus, in the method for integrating pressurized hydrocracking of heavy oil and coke gasification provided in the present disclosure, through the integration of the cracking section and the gasification section, to realize materials supply and energy complement among multiple reactions, such as heavy oil cracking, catalytic hydrogenation and coke gasification under a pressurized condition, which can not only improve the yield and the quality of the light oil product, but also avoid the problems, such as difficult recycle operations, complex process, large footprint, high investment and the like among multiple reactors. In addition, it also solves a problem of high energy consumption in the current heavy oil upgrading process.

Besides, by adjusting a gas volume and a flow rate of the upward syngas, and with the two stages of solid particle circulations, the material and energy distribution of the entire reaction system can also be further controlled to achieve a balance of material and the energy, and thereby further improving the yield of the light oil product and lowering the energy consumption of the entire reaction system.

The present disclosure makes no specific limitations to the abovementioned heavy oil feedstock, which may be one or more of the following heavy oils, such as thickened oil, highly thickened oil, oil sand asphalt, atmospheric residual oil, vacuum residual oil, catalytic cracking slurry, solvent de-oiled asphalt or the like, or may be one or more of the following derived heavy oils, such as heavy tar and residual oil in a coal thermal cracking or a liquefaction process, heavy oil produced by retorting oil shale, a low-temperature thermal cracking liquid product in biomass or the like.

The inventors have found in the research that, the method for integrating pressurized catalytic hydrocracking of heavy oil and coke gasification provided in the present disclosure is particularly suitable for the upgrading processing of heavy oil feedstock with high Conradson carbon residue, which has good processing effects for heavy oil with Conradson carbon residue above 8 wt %, and still has excellent processing effects even for heavy oil with the Conradson carbon residue above 15 wt % t, and through which a large amount of high-quality light oil products can be obtained.

In the present disclosure, the hydrogenation catalyst, in addition to providing a hydrogenation catalytic activity, is capable of acting as a reaction bed material in the cracking section if the hydrogenation catalyst is solid. After finishing the reaction, the hydrogenation catalyst can be discharged from the system as ash. The discharged hydrogenation catalyst may be served as a disposable catalyst, or may be reused after being treated.

The present disclosure makes no specific limitations to the hydrogenation catalyst, where a suspended bed hydrogenation catalyst (which may also be referred to as a suspended bed hydrocracking catalyst) may be selected. For example, the hydrogenation catalyst may include a monometallic active component or a composite polymetallic active component that contains cadmium, copper, silver, gold, zinc, molybdenum, nickel, cobalt, manganese, tin, palladium, tungsten, iron or the like, the above hydrogenation catalyst may be active nanoparticles or powder particles formed by salts such as a sulfide salt, an oxide, an halide or the like, or water-soluble, oil-soluble, nanoparticle or other types of hydrogenation catalyst which is formed by evenly distributing the abovementioned particles in dispersed phases such as aqueous solution, alcohol solution or surfactant (including various organic acid salts such as naphthenates, petroleum sulfonates, alkylbenzene sulfonates or the like).

In particular, the hydrogenation catalyst may be selected from three groups: a molybdenum-based water-soluble catalyst composed of ammonium molybdate, phosphomolybdic acid, molybdenum oxide and the like; an oil-soluble catalyst composed of a molybdenite microcrystalline fine powder, an active metal organic acid salt, an organic metal compound or complex, an organic amine salt and the like; nanocatalyst particles composed of organic molybdenum compounds. Preferably, an oil-soluble catalyst with high dispersibility, high hydrogenation activity, and low economic cost is used as the hydrogenation catalyst.

According to different types of hydrogenation catalyst, the amount of hydrogenation catalyst is also different. In a specific implementation process, a mass ratio of the coke powder to the hydrogenation catalyst may generally be controlled at 1:0.01 to 0.3, and preferably 1:0.03 to 0.10.

In the present disclosure, the abovementioned hydrogenation catalyst may be added in various ways, for example, the hydrogenation catalyst may be mixed with the heavy oil feedstock and then enter the cracking section together. Alternatively, the hydrogenation catalyst may enter the cracking section along with the first-stage solid particles, that is, the hydrogenation catalyst enters the cracking section along with the first-stage solid particles of the first-stage circulation. Alternatively, the hydrogenation catalyst enters the cracking section independently, that is, the hydrogenation catalyst is injected separately into the cracking section.

Certainly, in a specific implementation, one or more of the abovementioned ways may be selected as feeding method of the hydrogenation catalyst. In order to ensure a more sufficient catalytic cracking and hydrogenation synergistic reaction of the heavy oil feedstock in the cracking section, it is desirable that at least part of the hydrogenation catalyst is mixed with the heavy oil feedstock and enters the cracking section together to ensure sufficient mixing of the hydrogenation catalyst and the heavy oil feedstock, for example, part of the hydrogenation catalyst may be mixed with the heavy oil feedstock, preheated, and then entered the cracking section through an atomizing nozzle. Beside, compared to other ways, adding the hydrogenation catalyst along with the heavy oil feedstock can also lower the amount of the hydrogenation catalyst used, and thereby lowering the use cost of the hydrogenation catalyst and even the difficulty of subsequent recycle processing.

However, the amount of the hydrogenation catalyst added along with the heavy oil feedstock should not be too large, otherwise it will easily lead to problems such as difficulties in transporting heavy oil feedstock, difficulties in atomization abrasion of the atomizing nozzle and other series of problems. In a specific implementation process, a mass of the hydrogenation catalyst entering along with the heavy oil feedstock is generally controlled at 0.5 to 1.5% of the mass of the heavy oil feedstock.

In the present disclosure, the above coke powder preferably has a microsphere structure to have a better fluidization performance. The particle size of the coke powder generally ranges from 10 to 500 μm, and preferably ranges from 20 to 200 μm.

In addition to the hydrogenation catalyst and the coke powder, an appropriate amount of a cracking catalyst may also be added into the cracking section to ensure a rapid cracking reaction. The present disclosure makes no specific limitations to the type and the amount of the cracking catalyst, which may be a cracking catalyst commonly used in the current heavy oil cracking process with a conventional amount. For example, in a specific implementation process, a modified clay catalyst, whose main components are $Al_2O_3$ (with a content about 53%) and $SiO_2$ (with a content about 43%), with a small amount of alkaline metal oxides and other impurities, is usually added. Certainly, a cracking catalyst in a solid state may also be used as a reaction bed material, or as a solid carrier.

As mentioned above, the heavy oil feedstock may be preheated before entering the cracking section. Usually, the heavy oil feedstock is preheated to 220 to 300° C. before entering the cracking section. Certainly, if the hydrogenation catalyst enters the cracking section along with the heavy oil feedstock, the heavy oil feedstock and the hydrogenation catalyst are mixed and preheated to 220 to 300° C. before entering the cracking section.

In a preferred embodiment of the present disclosure, a reaction temperature of the cracking section is 450 to 700° C., an operation pressure is 3 to 9 MPa, a mass ratio of solid particles to heavy oil feedstock (an agent-oil ratio) is 4 to 20, a reaction time is 1 to 20 seconds, and an apparent gas velocity is 1 to 20 m/s. Under the above conditions, through the pressurized catalytic hydrocracking reaction, a high-quality and high yield of light oil product can be obtained.

In a preferred embodiment of the present disclosure, a temperature of the gasification reaction is 850 to 1200° C., a pressure is 3 to 9 MPa, and an apparent gas velocity is 0.1 to 5.0 m/s; an average residence time of a coke powder that carrying the coke (the carbon-deposited coke powders) is 1 to 20 min. The gasification agent may be selected from oxygen-containing gas and/or vapor. Where the oxygen-containing gas may be, for example, oxygen, air, oxygen-enriched air and the like. The gasification reaction conducted under the abovementioned conditions ensures that the coke attached to the surface of the coke powder reacts fully and achieves the regeneration of the coke powder, and high-quality syngas can be obtained.

As mentioned above, the syngas generated in the gasification section goes upward in the coupled reactor and enters the cracking section from the top of the gasification section, and goes upward in the cracking section. The syngas not only guarantees a sufficient fluidization of coke powder particles, but also provides the heat required for the pressurized catalytic hydrocracking reaction. In addition, highly active hydrogen-rich syngas also provides a hydrogen atmosphere for the pressurized catalytic cracking reaction, which inhibits the coking in the heavy oil cracking process and improves the yield and the quality of light oil-gas.

In practical production, by way of adjusting type of the gasification agent, the flow volume of the gasification agent, the size of the coupled reactor and the like, the flow volume of the syngas may also be regulated to control a proportion of the coke powder going downward into the gasification section, so that the syngas is sufficient to achieve full fluidization of the coke powder and provide a suitable hydrogen atmosphere, and carry enough energy to ensure matching of a material flow and an energy flow of the coupled reactor and an stable operation of a process system.

Further, the coke generated in the cracking section is carried downward by the coke powder, before entering the gasification section, the coke powder is desirable to first undergo a stream stripping to remove light oil-gas product remaining on the surface of the coke powder, and thereby facilitating the implementation of subsequent gasification and regeneration. Where, a mass ratio of vapor to the feedstock oil is 0.1 to 0.3:1, a temperature of vapor is 200 to 400° C., and an apparent gas velocity of vapor is 0.5 to 5.0 m/s.

Accordingly, a stream stripping section may be provided in the lower portion of the cracking section. By providing the stream stripping section, the pressurized catalytic cracking reaction in the cracking section and the gasification reaction in the gasification section can be isolated to a certain extent, which can enhance the safety and the operational stability of entire heavy oil upgrading process.

In the specific implementation of the present disclosure, a small portion of the solid particles in the cracking section (primarily large-sized coke powder particles and a small amount of the hydrogenation catalyst) goes downward in the coupled reactor into the gasification section or is transported outside the coupled reactor into the gasification section, while the light oil-gas and most of the solid particles produced in the cracking reaction are transported upward via the synthesis gas (along with possible vapor of the stream stripping), leaving the coupling reactor and entering the gas-solid separator.

Further, high-speed vapor can be introduced into the cracking section from the bottom of the cracking section to grind the large-sized coke powder particles, so as to avoid the agglomeration, condensation and growth of coking powder particles, which may affect fluidization operations in the bed.

The high-temperature oil-gas and the solid particles carried by the high-temperature oil-gas are pre-separated via the first-stage gas-solid separation, where coarse particles with larger particle size, i.e. the first-stage solid particles, are returned to the cracking section of the coupled reactor to be used as a reaction carrier and provide part of the heat required for the cracking reaction. Generally, the particle size of the first-stage solid particles is greater than 20 μm. In addition, the gas-solid separator may also be provided with a coarse particle discharge port to discharge the solid particles after coking according to practical operation situations, so as to prevent particles with larger particle size from blocking a pipeline and increase the flexibility and reliability of the operation process.

The oil-gas product after the first-stage gas-solid separation processing is then subjected to the second-stage gas-solid separation for further removing of the fine particles contained therein. After purification, the cleaned oil-gas is subjected to a subsequent gas-liquid separation and an oil-gas absorption and stabilization processing to obtain products such as light oil, liquefied gas, syngas and the like. The fine particles obtained via separation, i.e. the second-stage solid particles, may flow into the gasification section through a material returning apparatus for gasification and regeneration. Generally, the particle size of the second-stage solid particles is less than 50 μm, so that the gasification reaction can be carried out quickly. In addition, the gas-solid separator may also be provided with a particle discharge port to discharge the coked solid particles according to practical operation processes, so as to prevent problems, such as clogging of pipeline and the like, during the operation process, and increase the reliability of the operation.

In the gas-solid separation in practical production, it is difficult to achieve an absolute control to the particle size of the solid particles. Therefore, in a specific implementation process, the first-stage solid particles are usually controlled to mainly contain coke powder particles with a particle size of 50 μm or more, while the second-stage solid particles mainly contain coke powder particles with a particle size of 20 μm or less.

By separating the first-stage solid particles and the second-stage solid particles of different particle size ranges, it is possible to control the amount of coke powder returned to the cracking section and the gasification section, not only to ensure that enough coke powder particles are returned to the gasification section to obtain sufficient high-quality syngas, so that sufficient heat can be transferred to the cracking section with the syngas going upward into the cracking section, but also to enable the cracking reaction to be carried out in a hydrogen-rich environment, thus improving the quality of the light oil-gas, and moreover, reducing the reaction pressure in the gasification section and the energy consumption of the entire heavy oil upgrading process.

Furthermore, a gasification catalyst may also be introduced into the gasification section, so that the gasification reaction in the gasification section can proceed quickly and smoothly. The present disclosure makes no specific limitations to the used gasification catalyst, for example, the gasification catalyst may be selected from one or more of a natural ore, a synthetic material and a derivative compound, which contain a single metal or a combination of multiple metals of an alkali metal, alkaline-earth metal and Group VIII metal. Specifically, one or more of a disposable catalytic material, such as sludge, red mud, steel slag, blast furnace ash and coal ash, which is rich in alkali metals and alkaline earth metals, and solid particles of natural ores, synthetic materials and derivative compounds, which contain a single metal or a combination of multiple metals of an alkali metal, alkaline-earth metal and Group VIII metal, may be selected.

Another aspect of the present disclosure is to provide an apparatus for integrating pressurized hydrocracking of heavy oil and coke gasification, configured to implement the method described in the abovementioned first aspect, the apparatus includes at least a coupled reactor, a gas-solid separator and a fractionating tower, where:

the coupled reactor has a cracking section in an upper portion and a gasification section in a lower portion, and the cracking section and the gasification section are internally connected with each other;

the cracking section has a feedstock oil inlet, an oil-gas outlet, a regenerated coke powder inlet and a first-stage solid particle inlet; and the gasification section has a gasification agent inlet, a regenerated coke powder outlet and a second-stage solid particle inlet;

the gas-solid separator includes a first-stage gas-solid separator and a second-stage gas-solid separator, and both the first-stage gas-solid separator and the second-stage gas-solid separator have a feedstock inlet, a gas outlet, and a solid outlet;

the oil-gas outlet of the cracking section is connected with the feedstock inlet of the first-stage gas-solid separator, the gas outlet of the first-stage gas-solid separator is connected to the feedstock inlet of the second-stage gas-solid separator, and the solid outlet of the first-stage gas-solid separator is connected with the first-stage solid particle inlet of the cracking section, the solid outlet of the second-stage gas-solid separator is connected with the second-stage solid particle inlet of the gasification section, the regenerated coke powder outlet of the gasification section is connected with the regenerated coke powder inlet of the cracking section, and the gas outlet of the second-stage gas-solid separator is connected with the feedstock inlet of the fractionating tower.

The method for integrating pressurized hydrocracking of heavy oil and coke gasification provided in the present disclosure using the coupled reactor integrating the cracking section and the gasification section to realize material supply and energy complement among reactions, such as the heavy oil catalytic hydrocracking, the coking gasification under a pressurized condition, which can not only improve both the yield and the quality of the light oil product, but also solve a problem of high energy consumption in the current heavy oil upgrading process. And moreover, the method also solves problems in the current flexible coking process, such as difficult material recycle operations, complex process, large footprint, high investment and the like among multiple reactors.

Besides, by adjusting a gas volume and a flow rate of the upward syngas and the like to control a ratio of the upward and downward solid particles, and with the two stages of solid particle circulation, the material and energy distribution of the entire reaction system can be further controlled to achieve a balance of material and the energy, and thereby further improving the yield of the light oil product and lowering the energy consumption of the entire reaction system.

By using the apparatus for integrating pressurized hydrocracking of heavy oil and coke gasification provided in the present disclosure, the abovementioned method can be implemented to improve the yield and the quality of the light oil product; moreover, the use of the apparatus can also reduce the energy consumption and difficulties in processing in the heavy oil upgrading process.

BRIEF DESCRIPTION OF DRAWING(S)

DESCRIPTION OF REFERENCE NUMERALS

Figure 1:
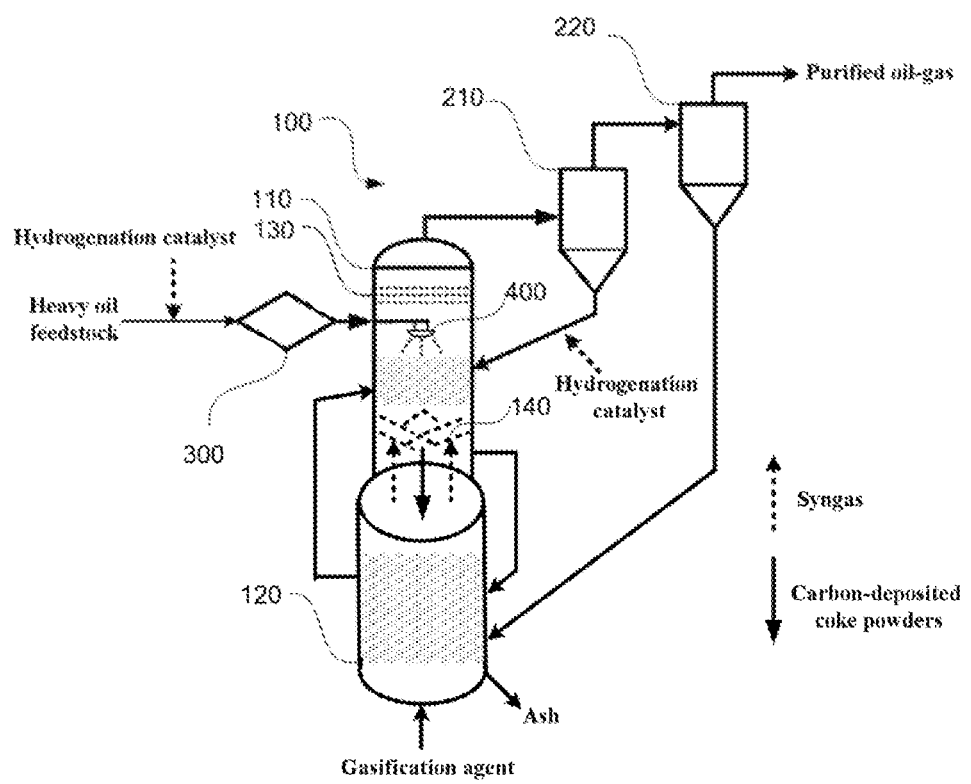
FIG. 1 is a schematic diagram 1 of an apparatus for integrating pressurized hydrocracking of heavy oil and coke gasification according to an embodiment of the present disclosure.

| | |
|---|---|
| 100 - coupled reactor; | 110 - cracking section; |
| 120 - gasification section; | 130 - cooling and washing section; |
| 140 - stream stripping section; | 210 - first-stage solid-gas separator; |
| 220 - second-stage solid-gas separator; | 300 - preheating mixer; |
| 400 - atomizer. | |

DESCRIPTION OF EMBODIMENTS

In order to make the purposes, technical solutions and advantages of embodiments of the present disclosure more clear, technical solutions of the embodiments of the present disclosure will be described clearly and completely below in combination with the accompanying drawings of the embodiments of the present application. Obviously, the described embodiments are merely a part, but not all, of the embodiments of the present application. Based on the embodiments of the present application, all the other embodiments acquired by those skilled in the art without any creative effort shall belong to the protection scope of the present disclosure.

Embodiment 1

The present embodiment provides a method for integrating pressurized hydrocracking of heavy oil and coke gasification, where a coupled reactor having a cracking section and a gasification section that are internally connected with each other is used as a reactor, the method includes the following steps:

feeding a heavy oil feedstock and a hydrogenation catalyst into the cracking section in an upper portion of the coupled reactor, and in the presence of hydrogen, the heavy oil feedstock is contacted with a coke powder in a fluidized state to carry out a pressurized catalytic cracking reaction under catalysis of the hydrogenation catalyst to generate light oil-gas and coke;

carrying the coke downward by the coke powder into the gasification section in a lower portion of the coupled reactor, and carrying out a gasification reaction with a gasification agent to generate syngas and regenerate the coke powder; where obtained regenerated coke powder is returned to the cracking section; the syngas goes upward in the coupled reactor into the cracking section to merge with the light oil-gas, and is guided out from the coupled reactor to a gas-solid separator;

subjecting the light oil-gas and the syngas in the gas-solid separator to a first-stage gas-solid separation and a second-stage gas-solid separation sequentially, first-stage solid particles and second-stage particles are separated out in sequence, and a purified oil-gas product is collected, and the first-stage solid particles are returned to the cracking section to form a first-stage circulation; and the second-stage solid particles are returned to the gasification section to carry out a gasification reaction and form a second-stage circulation;

performing an oil-gas fractionation to the purified oil-gas product, and a light oil product and a syngas product are collected.

Specifically, the above-mentioned heavy oil feedstock may be one or more of the following heavy oils, such as thickened oil, highly thickened oil, oil sand asphalt, atmospheric residual oil, vacuum residual oil, catalytic cracking slurry, solvent de-oiled asphalt or the like, or may be one or more of the following derived heavy oils, such as heavy tar and residual oil in a coal thermal cracking or a liquefaction process, heavy oil produced by retorting oil shale, a low-temperature thermal cracking liquid product in biomass or the like. In some examples of the present disclosure, Conradson carbon residue of the heavy oil feedstock is larger than or equal to 8 wt %, and preferably not less than 10 wt %.

Specifically, a suspended bed hydrogenation catalyst may be selected as the abovementioned hydrogenation catalyst. For example, the hydrogenation catalyst may be a monometallic active component or a composite polymetallic active component that contains cadmium, copper, silver, gold, zinc, molybdenum, nickel, cobalt, manganese, tin, palladium, tungsten, iron or the like, the above hydrogenation catalyst may be active nanoparticles or powder particles formed by salts such as a sulfide salt, an oxide, an halide or the like, or water-soluble, oil-soluble, nanoparticle or other types of hydrogenation catalyst which is formed by evenly distributing the abovementioned particles in dispersed phases such as aqueous solution, alcohol solution or surfactant (including various organic acid salts such as naphthenates, petroleum sulfonates, alkylbenzene sulfonates or the like).

In particular, the hydrogenation catalyst may be selected from three groups: a molybdenum-based water-soluble catalyst composed of ammonium molybdate, phosphomolybdic acid, molybdenum oxide and the like; an oil-soluble catalyst composed of a molybdenite microcrystalline fine powder, an active metal organic acid salt, an organic metal compound or complex, an organic amine salt and the like; nanocatalyst particles composed of organic molybdenum compounds. Preferably, an oil-soluble catalyst with high dispersibility, high hydrogenation activity and low economic cost is used as the hydrogenation catalyst.

Specifically, the abovementioned hydrogenation catalyst may be mixed with the heavy oil feedstock and then enter the cracking section together. Alternatively, the hydrogenation catalyst may enter the cracking section along with the first-stage solid particles, that is, the hydrogenation catalyst enters the cracking section along with the first-stage solid particles of the first-stage circulation. Alternatively, the hydrogenation catalyst enters the cracking section independently, that is, the hydrogenation catalyst is injected separately into the cracking section. In a specific implementation, the hydrogenation catalyst may be added in one or more of the abovementioned ways.

The above coke powder preferably has a microsphere structure to have a better fluidization performance, and the particle size generally ranges from 10 to 500 μm, and preferably ranges from 20 to 200 μm.

For reactive condition in the abovementioned cracking section, generally, a reaction temperature is 450 to 700° C., an operation pressure is 3 to 9 MPa, a mass ratio of solid particles to heavy oil feedstock (an agent-oil ratio) is 4 to 20, a reaction time is 1 to 20 seconds, and an apparent gas velocity is 1 to 20 m/s.

Further, before the abovementioned coke powder that carrying the coke enters the gasification section, it is desirable to first undergo a stream stripping, where a mass ratio of vapor to the heavy oil feedstock is 0.1 to 0.3:1, a temperature of vapor is 200 to 400° C., and an apparent gas velocity of vapor is 0.5 to 5.0 m/s. By implementing the stream stripping, a small amount of light oil gas remaining on the surfaces and in the pores of the coke powder can be removed, thereby facilitating the subsequent regeneration.

Further, before the coke powder that carrying the coke enters the gasification section, a particle size refining processing, for example, a steam injection may also be performed to separate the coke powder with a tendency to agglomerate and prevent the agglomeration, condensation and growth of coking powder particles, which may affect fluidization operations in the bed.

The coke powder that carrying the coke enters the gasification section and reacts with the gasification agent at high temperature and pressure to produce hydrogen and carbon monoxide from the coke attached to the coke powder, and thereby obtaining syngas and regenerating of the coke powder.

Specifically, the reaction conditions in the gasification section can generally be controlled as follows: a temperature is 850 to 1200° C., a pressure is 3 to 9 MPa, and an apparent gas velocity is 0.1 to 5.0 m/s; an average residence time of coke powder that carrying the coke is 1 to 20 min. The gasification agent may be oxygen-containing gas, such as oxygen, ordinary air, oxygen-enriched air and the like, or may be vapor, or may be a mixture of oxygen-containing gas and vapor.

The unreacted solid ash and hydrogenation catalyst residue during the gasification reaction of the coke powder that carrying the coke may be discharged out of a reaction system after accumulation, where the hydrogenation catalyst residue can be recycled after an appropriate processing, and heavy metal components, such as Ni, V and the like in the solid ash can be recycled through a subsequent processing.

Most of the coke powder regenerated in the gasification section is transported into the cracking section for recycling, while high-quality syngas (which may carry a small amount of coke powder) goes upstream in the coupled reactor into the cracking section to provide heat and a hydrogen-containing atmosphere required for the heavy oil cracking reaction.

By way of adjusting the type of the gasification agent, the flow volume of the gasification agent, the size of the coupled reactor and the like, the flow volume of the upward syngas, the amount of coke powder carried by the upward syngas may be regulated, to ensure matching of a material flow and an energy flow of the coupled reactor and an stable operation of a process system.

The syngas goes upward and enters the cracking section, and after being fed into the light oil gas, it continues to flow upwards and is guided out from the coupled reactor into the gas-solid separator, where the first-stage gas-solid separation and the second-stage gas-solid separation are performed in sequence to separate out correspondingly the first-stage solid particles and the second-stage solid particles. Where, the first-stage solid particles mainly are coke powders with relatively large particle size and a small amount of hydrogenation catalyst, which are returned to the cracking section for recycling, and the second-stage solid particles mainly are coke powders with relatively small particle size and a small amount of hydrogenation catalyst, which are returned to the gasification section for gasification and regeneration.

Embodiment 2

Figure 2:
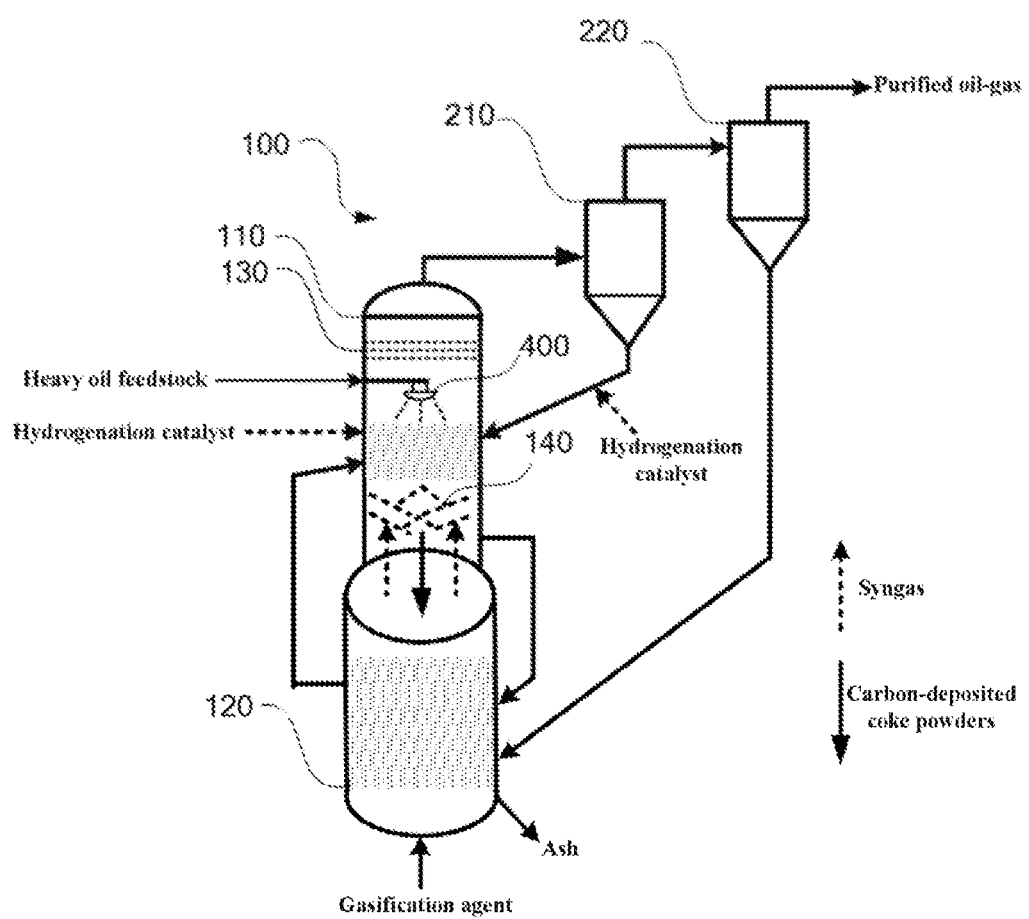
FIG. 2 is a schematic diagram 2 of an apparatus for integrating pressurized hydrocracking of heavy oil and coke gasification according to an embodiment of the present disclosure.
Figure 3:
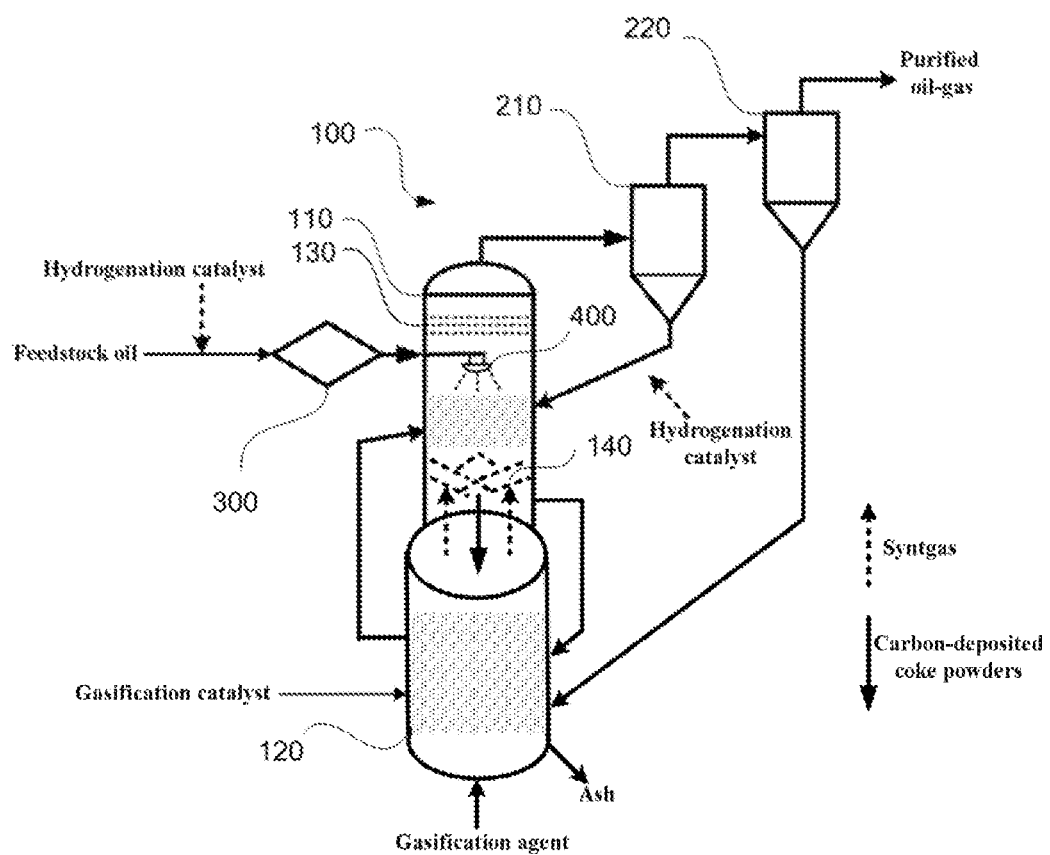
FIG. 3 is a schematic diagram 3 of an apparatus for integrating pressurized hydrocracking of heavy oil and coke gasification according to an embodiment of the present disclosure.

The present embodiment provides an apparatus for integrating pressurized hydrocracking of heavy oil and coke gasification, configured to implement the method described in the abovementioned embodiment 1, as shown in FIG. 1, FIG. 2 and FIG. 3, the apparatus includes at least a coupled reactor 100, a gas-solid separator (not shown) and a fractionating tower (not shown), where:

the coupled reactor 100 has a cracking section 110 in an upper portion and a gasification section 120 in a lower portion, and the cracking section 110 and the gasification section 120 are internally connected with each other;

the cracking section 110 has a feedstock oil inlet, an oil-gas outlet, a regenerated coke powder inlet and a first-stage solid particle inlet; and the gasification section 120 has a gasification agent inlet, a regenerated coke powder outlet and a second-stage solid particle inlet;

the gas-solid separator includes a first-stage gas-solid separator 210 and a second-stage gas-solid separator 220, and both the first-stage gas-solid separator 210 and the second-stage gas-solid separator 220 have a feedstock inlet, a gas outlet, and a solid outlet;

the oil-gas outlet of the cracking section 110 is connected with the feedstock inlet of the first-stage gas-solid separator 210, the gas outlet of the first-stage gas-solid separator 210 is connected to the feedstock inlet of the second-stage gas-solid separator 220, and the solid outlet of the first-stage gas-solid separator 210 is connected with the first-stage solid particle inlet of the cracking section 110, the solid outlet of the second-stage gas-solid separator 220 is connected with the second-stage solid particle inlet of the gasification section 120, the regenerated coke powder outlet of the gasification section 120 is connected with the regenerated coke powder inlet of the cracking section 110, and the gas outlet of the second-stage gas-solid separator 210 is connected with the feedstock inlet of the fractionating tower.

Specifically, the abovementioned coupled reactor 100 may specifically be obtained by suitable modification and assembly of a cracking reactor and a gasification reactor commonly used in the art. Where, the cracking reactor may, for example, be a fluidized bed reactor, the bottom end of which is interconnected with the top end of the gasification reactor. Preferably, the cracking reactor and the gasification reactor are installed coaxially to facilitate the transport and circulation of materials.

Further, as shown in FIG. 1, the aforementioned apparatus may further include a preheating mixer 300, and the preheating mixer 300 may be specifically connected with the cracking section 110. The heavy oil feedstock and the hydrogenation catalyst are first fully mixed and preheated in the preheating mixer 300, and then enter the cracking section 110 together.

Further, the aforementioned apparatus may further include an atomizer 400. The atomizer 400 may be arranged outside the coupled reactor 100 and achieve a connection to the cracking section 110 via the feedstock oil inlet. For example, the atomizer 400 may be connected between the preheating mixer 300 and the cracking section 110. Thus, the heavy oil feedstock, after being preheated, it is firstly atomized in the atomizer 400 and then enters the cracking section 110. Alternatively, the atomizer 400 may also be positioned in the coupled reactor 100 as an atomizing feed section of the cracking section 110, and the atomizing feed section may specifically correspond to the location of the feedstock oil inlet, so that the preheated heavy oil feedstock, after entering the cracking section 110 through the feedstock oil inlet, is first atomized in the atomizing feed section, and then undergoes a pressurized catalytic hydrocracking reaction.

Further referring to FIG. 1, FIG. 2 and FIG. 3, the aforementioned coupled reactor 100 may further include a cooling and washing section 130, the cooling and washing section 130 is generally arranged in an upper portion of the cracking section 110. Specifically, a structure of the cooling and washing section 130 can be a current conventional structure of washing section (or a de-superheating section) of a coking fractionating tower or a catalytic fractionating tower, which is generally constructed with eight or ten layers of herringbone baffles or tongue-shaped trays to exchange heat between the high-temperature oil gas (i.e., light oil gas and the syngas) moving upward and the low-temperature liquid moving downward in the cooling and washing section 130, inhibit excessive cracking and coking and the like, and remove solid particle powder entrained in the high-temperature oil-gas, and then the high-temperature oil-gas is discharged from the top of the cracking section 110 for a gas-solid separation.

The heavy oil feedstock, for example, may be adopted as the abovementioned low-temperature liquid. Since the amount of heavy oil feedstock after heat exchange is not large, and the heavy oil feedstock is fully dispersed during the heat exchange process with high-temperature oil-gas, generally, the heavy oil feedstock as the low-temperature liquid may directly be used to carry out the pressurized catalytic hydrocracking reaction in the cracking section 110.

Further referring to FIG. 1, FIG. 2 and FIG. 3, the abovementioned coupled reactor 100 may also include a stream stripping section 140. The stream stripping section 140 may be provided in the lower portion of the cracking section 110, or between the cracking section 110 and the gasification section 120. During the process of the coke powder that carrying the coke going downwards, light oil gas product remaining on the surface of the coke powder is removed through the stream stripping section 140, then the coke powder may continuously go downwards into the gasification section 120 for gasification and regeneration, or may be guided out from the coupled reactor 100 and transported to the gasification section 120 for gasification and regeneration.

Specifically, the stream stripping section 140 may include a multi-layer stripping structure, which may be formed by using one or a more of the following stripping structures, such as a herringbone baffle, an annular baffle, a conical baffle, a grating baffle, a bulking filler, regular filler or the like.

In addition, by providing the stream stripping section 140, not only the coking and blockage of large-sized coke powder particles can be avoided, but also the cracking section 110 and the gasification section 120 can be isolated to some extent, so that the pressurized catalytic hydrocracking reaction and gasification reaction can be proceeded relatively independently, which increases safety and operational stability of the entire coupled reactor 100.

As mentioned above, the gasification reaction of coke and gasification agent occurs within the gasification section 120 and the regeneration of coke powder is achieved to obtain regenerated coke powder and syngas. Since inferior heavy oil has high content of heavy metals and ash, in the process of heavy oil upgrading, ashes of heavy metals, impurities and the like and hydrogenation catalyst residue will gradually accumulate. This ash and residue may be discharged via an ash discharging outlet (not shown) located at a lower portion of the gasification section 120. The discharged ash contains high content of heavy metals, and the heavy metals such as Ni, V and the like may be recycled via a subsequent processing apparatus, and the hydrogenation catalyst residue may be regenerated for recycle or discharged.

In addition, the above apparatus may further include a gasification agent supply apparatus (not shown), the gasification agent supply apparatus is used to supply a gasification agent to the gasification section 120, for example, feeding the gasification agent into the gasification section 120 via a gasification agent inlet at the bottom of the gasification section 120.

In the present embodiment, the abovementioned gas-solid separator may be a combination of conventional gas-solid separation devices in the field of petroleum processing, for example, may be a combination of cyclone separators. In practical use, the light oil-gas and the syngas carrying solid particles (which mainly are coke powders and a small amount of hydrogenation catalyst) are supplied into the cyclone separator via an upper inlet, a centrifugal force generated by a gas-solid mixture when rotating at high speed is utilized to separate the solid particles out from a gas flow of the light oil-gas and the syngas, and the solid particles may be collected at an solid discharging port at the bottom of the cyclone separator, and purified oil-gas is discharged via a gas discharging port at the top of the cyclone separators for further processing and utilization.

Specifically, after the syngas and the light oil-gas are guided out from the coupled reactor 100, two stages of gas-solid separation are performed in sequence. Correspondingly, the gas-solid separator also has a first-stage gas-solid separator 210 and a second-stage gas-solid separator 220. Where, both the first-stage gas-solid separator 210 and the second-stage gas-solid separator 220 may include a single cyclone separator, or may be formed by a plurality of cyclone separators in series or/and parallel connection. The first-stage gas-solid separator 210 and the second-stage gas-solid separator 220 are mainly used to represent the sequence of collected materials, but not the number.

Further, the apparatus provided in the present embodiment further includes a material transporting system, the material transporting system at least includes a material returning apparatus that is connected between the solid outlet of the first-stage gas-solid separator 210 and the first-stage solid particle inlet of the cracking section 110, a material returning apparatus that is connected between the solid outlet of the second-stage gas-solid separator 210 and the second-stage solid particle inlet of the gasification section 110, and a material transporting apparatus that is connected between the regenerated coke powder outlet of the gasification section 120 and the regenerated coke powder inlet of the cracking section 110. In addition, if the coke powder that carrying the coke in the cracking section 110 is transported to the gasification section outside the coupled reactor 100, then a corresponding material transporting apparatus may be provided between the cracking section 110 and the gasification section 120. Both the abovementioned material returning apparatus and material transporting apparatus may be material transporting instruments or apparatus commonly used in the field of petrochemical engineering. In addition, the abovementioned material returning apparatus connected between the coupled reactor 100 and the gas-solid separator may have a particle discharging port provided thereon, solid particles with over large particle size or over small particle size may be discharged via the particle discharging port for recycle processing.

In order to illustrate practical effects of the present disclosure, the technical solutions of the present disclosure will be further illustrated below with combination of specific application embodiments 1 to 3.

Application Embodiment 1

Referring to FIG. 1, the heavy oil feedstock and the hydrogenation catalyst are first sufficiently preheated and mixed in the preheating mixer 300, and then enter the cracking section 110 in an upper portion of the coupled reactor 100, and then atomized by the atomizer 400, the atomized heavy oil carrying a hydrogenation catalyst comes into contacts with a coke powder in a fluidized state, and a pressurized catalytic cracking reaction takes place to obtain light oil gas and coke.

The coke is attached to the surface of the coke powder. After coking, except for part of the coke powders that leaves the cracking section 110 upward, the remaining coke powders with a larger particle size goes downward due to the gravity and passes through the stream stripping section 140 to remove the light oil-gas product remaining on the surface of the coke powder, and subsequently, the carbon-deposited coke powders may directly go downward into the gasification section 120, or is guided out from the cracking section 110 and enter the gasification section 120 via an external material transporting apparatus.

In the gasification section 120, a high-temperature pressurized gasification reaction takes place between the carbon-deposited coke powders and the gasification agent which is supplied via a gasification agent inlet at the bottom of the gasification section 120, so that the coke attached to the surface of the coke powder reacts with the gasification agent to generate high-quality syngas, and meanwhile the coke powder is regenerated.

In addition, the solid ash of the coke powder that is unable to participate in the gasification reaction and the hydrogenation catalyst residue may be discharged out of the coupled reactor 100 via a residue discharging port after accumulation, the hydrogenation catalyst residue may be recycled after proper treatment, and the heavy metals in the solid ash may be recycled after subsequent treatment.

The regenerated coke powder may be transported to the cracking section 110 via the material transporting device for recycling; high-temperature syngas (which may carry a small amount of regenerated coke powder) goes upward in the coupled reactor 100 and enters the cracking section 110, which provides heat and a hydrogen reaction atmosphere required for the heavy oil cracking reaction. Syngas is rich in active small molecules such as hydrogen and CO. Under conditions of high temperature and pressure and in the presence of hydrogenation catalyst, the syngas can effectively improve the yield and the quality of the light oil-gas, and meanwhile reduce the yield of coke and improve the product distribution of the heavy oil cracking.

The high-temperature light oil gas and the syngas (collectively referred to as high-temperature oil gas) merged from the bottom of the cracking section 110 go upward inside the cracking section 110, and pass through the cooling and washing section 130 to be cooled down and remove part of solid particles therein, and meanwhile achieve the cooling through heat transfer, and then are guided out from the coupled reactor 100 and enter the gas-solid separator.

The high-temperature oil gas first enters the first-stage gas-solid separator 210 for gas-solid separation to remove coarse particles therein. The collected solid particles are returned to the cracking section 110 to form a first-stage circulation of the solid particles in the cracking section 110, providing part of the heat required for the cracking process and a place for a gas-solid contact reaction.

The high-temperature oil gas preliminarily purified by the first-stage gas-solid separator 210 then enters the second-stage gas-solid separator 220 for further separation, to remove fine particles therein and obtain a purified oil-gas product. The collected solid particles are returned to the gasification section 120 for gasification regeneration to form a second-stage circulation.

The purified oil-gas product may go through subsequent gas-liquid separation and oil-gas absorption and stabilization processing to obtain gas products and high-quality liquid products, such as syngas, dry gas, liquefied gas and the like. Certainly, the obtained light oil product may be further separated to obtain liquid products with different distillation range components, where the heavy oil component may be mixed with the heavy oil feedstock to perform a recycling processing; and the syngas may serve as a hydrogen source of a refinery.

In the present embodiment, an overall energy efficiency of the system is improved by matching the heat and the materials of two reaction areas of heavy oil cracking and coke gasification. In a practical operation process, a gas velocity in the coupled reactor 100 may also be controlled by adjusting the conditions such as the gasification agent, stripping vapor and temperature and the like, so as to adjust a ratio of the upward and downward coke powders in the cracking section 110 and to maintain a stable operation of system. In addition, By adjusting the type of the gasification agent, the flow volume of the gasification agent, the size of the coupled reactor 100 and the like, the flow volume of the upward syngas, the amount of coke powder carried by the upward syngas and a velocity of the gas in the coupled reactor 100 may be regulated, so that the matching of a material flow and an energy flow of the coupled reactor 100 can be ensured, and thereby ensuring an stable operation of a process system.

A vacuum residue oil of a domestic refinery is processed according to the process of the application embodiment 1, and compared with distribution of heavy oil cracking products under ordinary pressure and ordinary atmosphere.

The properties of the vacuum residue oil are as shown in table 1. It can be seen from table 1 that the vacuum residue has a large density, a residual carbon value is up to 11.66 wt %, and an initial boiling point is about 460° C., which belongs to heavy feedstock oil that is difficult to convert.

TABLE 1

| Properties of vacuum residue oil | |
|---|---|
| Density (20° C.), g · cm$^{-3}$ | 0.94 |
| Residual carbon value (wt %) | 11.66 |
| n(H)/n(C) (molar ratio) | 1.64 |
| Relative molecular weight | 723 |
| Elementary composition wt % | |
| C | 87.36 |
| H | 11.93 |
| S | 0.21 |
| N | 0.50 |

The process conditions of the present application embodiment (hereinafter referred to as working condition 1) are:

The oil-soluble hydrogenation catalyst is selected and used as the hydrogenation catalyst, and the total amount of the hydrogenation catalyst accounts for 4% of the mass of the coke powder. Where, part of the hydrogenation catalyst enters the cracking section 110 with the heavy oil feedstock, and the remaining part of the hydrogenation catalyst is added with the first-stage circulation. In the cracking section 110, an appropriate amount of low-activity modified clay catalyst is also added as a cracking catalyst (which is mainly composed of two components $Al_2O_3$: 53% and $SiO_2$: 43%, and a small amount of alkaline metal oxides and other impurities), which approximately accounts for 5% of the mass of the solid carrier particles used.

1.0 wt % of the oil-soluble hydrogenation catalyst is premixed in the heavy oil feedstock, and then a pressurized catalytic hydrocracking reaction is carried out in a hydrogen-containing atmosphere (30% hydrogen and the remaining vapor). The reaction conditions are: 3 MPa, 500° C., an agent-oil ratio is 6.0 (a mass ratio), a reaction time is 15 seconds, and an apparent gas velocity is 5.0 m/s.

The gasification agent used in the gasification section 120 is an equal volume of water vapor and oxygen, a temperature of the gasification reaction is 850° C., a pressure is 3.0 MPa, an apparent gas velocity is 0.2 m/s, and a residence time of the coke powder is 20 min.

The conditions for stream stripping were: a mass ratio of vapor to heavy oil feedstock was 0.25:1, a temperature of the vapor is 300° C., and an apparent gas velocity of the vapor is 1.5 m/s.

The heavy oil conversion experiment was conducted under the abovementioned working condition 1. The distribution of the obtained heavy oil cracking products is shown in table 2.

Meanwhile, in this application embodiment, atmospheric cracking experiment of the same heavy oil feedstock under an atmosphere of pure water vapor is taken as a control (hereinafter referred to as working Condition 2), with the specific process condition were: an atmospheric pressure, 500° C., and the distribution of the obtained heavy oil cracking products is as shown in table 2.

TABLE 2

| Yield of cracking products (wt %) | Working condition 1 | Working condition 2 |
|---|---|---|
| Cracking gas | 10.40 | 11.79 |
| Liquid product | 82.18 | 79.65 |
| C5~500° C. light oil fraction | 77.63 | 69.63 |
| Coke | 7.42 | 8.56 |
| Heavy oil fraction in the liquid (>500° C.) | 10.40 | 17.60 |

It can be seen from distributions of heavy oil cracking products under two working conditions that, compared with atmospheric steam cracking, yield of liquid under working condition 1 is improved under the combined effect of high pressure, in the presence of hydrogen and hydrogenation catalyst, and meanwhile yields of cracking gas and coke decrease. Fraction analysis of the cracking liquid showed that a heavy oil fraction in liquid oil products obtained under the conditions of pressurized catalytic hydrocracking are greatly decreased. The above results indicate that the operations of integrating heavy oil catalytic hydrogenation and coke gasification can not only improve the distribution of cracking products to certain extent, but also improve the quality of cracking oil products.

Application Embodiment 2

As an alternative solution of application embodiment 1, the way of adding hydrogenation catalyst of the application embodiment 2 is different from that of the application embodiment 1. As shown in FIG. 2, specifically, part of the hydrogenation catalyst is added with the first-stage circulation, and the remaining hydrogenation catalyst is added separately.

Except for the way of adding hydrogenation catalyst, the upgrading processing is performed to the same vacuum residue oil under the same working condition of the application embodiment 1, the distribution of the heavy oil cracking products is basically the same as that of the application embodiment 1, where the yield of liquid is about 82 wt %, the yield of coke is about 7.5 wt %, and the yield of the heavy oil cut fraction (>500° C.) is about 10 wt %.

Application Embodiment 3

As shown in FIG. 3, in this application embodiment, on basis of the application embodiment 1, a step of injecting a gasification catalyst into the gasification section 120 is added, where the used gasification catalyst is a calcium-based metal oxide catalyst, and the amount of added gasification catalyst is about 5% of the solid carrier particles by mass.

The upgrading processing is performed to the same vacuum residue oil under the same working condition of the application embodiment 1, the distribution of the heavy oil cracking products is basically the same as that of the application embodiment 1, where the yield of liquid is about 83 wt %, the yield of coke is about 7.5 wt %, and the yield of the heavy oil cut fraction (>500° C.) is about 10 wt %. In addition, compared with the application embodiment 1, after adding 5% gasification catalyst, on the one hand, the hydrogen content in the gasified syngas can be increased by about 5 percentage points, and meanwhile the reaction time achieving the same gasification carbon conversion rate is shortened by about 30%.

Finally, it should be noted that: the above embodiments are merely used for illustrating the technical solutions of the present disclosure, but not being construed as limiting the present disclosure. Although the present disclosure is described in detail with reference to the forgoing embodiments, those ordinary skilled in the art should understand that modifications may still be made to the technical solutions of the forgoing embodiments or equivalent replacements may be made to a part or all of the technical features therein. These modifications or replacements do not make the essence of corresponding technical solutions depart from the scope of the technical solutions of the embodiments of the present disclosure.

What is claimed is:

1. A method for integrating pressurized hydrocracking of heavy oil and coke gasification, wherein a coupled reactor having a cracking section and a gasification section that are internally connected with each other is used as a reactor, the method comprises the following steps:
   feeding a heavy oil feedstock and a hydrogenation catalyst into the cracking section in an upper portion of the coupled reactor, and in the presence of hydrogen, the heavy oil feedstock is contacted with a coke powder in a fluidized state to carry out a pressurized catalytic cracking reaction under catalysis of the hydrogenation catalyst to generate light oil-gas and coke;
   carrying the coke downward by the coke powder into the gasification section in a lower portion of the coupled reactor, and carrying out a gasification reaction with a gasification agent to generate syngas and regenerate the coke powder; wherein obtained regenerated coke powder is returned to the cracking section; the syngas goes upward in the coupled reactor into the cracking section to merge with the light oil-gas, and is guided out from the coupled reactor to a gas-solid separator;
   subjecting the light oil-gas and the syngas in the gas-solid separator to a first-stage gas-solid separation and a second-stage gas-solid separation sequentially, first-stage solid particles and second-stage particles are separated out in sequence, and a purified oil-gas product is collected, and the first-stage solid particles are returned to the cracking section to form a first-stage circulation; and the second-stage solid particles are returned to the gasification section to carry out a gasification reaction and form a second-stage circulation; and
   performing oil-gas fractionation to the purified oil-gas product, and a light oil product and a syngas product are collected.

2. The method according to claim 1, wherein a feeding method of the hydrogenation catalyst is selected from at least one of the following methods:
   the hydrogenation catalyst is mixed with the heavy oil feedstock and then enter the cracking section together;
   the hydrogenation catalyst enters the cracking section along with the first-stage solid particles; and
   the hydrogenation catalyst enters the cracking section separately.

3. The method according to claim 1, wherein Conradson carbon residue of the heavy oil feedstock is not less than 8 wt %.

4. The method according to claim 2, wherein Conradson carbon residue of the heavy oil feedstock is not less than 8 wt %.

5. The method according to claim 1, wherein a particle size of the coke powder ranges from 10 to 500 μm; and/or, a mass ratio of the coke powder to the hydrogenation catalyst is 1:0.01 to 1:0.3.

6. The method according to claim 1, wherein a particle size of the first-stage solid particle is larger than 20 μm, and a particle size of the second-stage solid particle is less than 50 μm.

7. The method according to claim 5, wherein a particle size of the first-stage solid particle is larger than 20 μm, and a particle size of the second-stage solid particle is less than 50 μm.

8. The method according to claim 1, wherein the heavy oil feedstock is preheated to 220 to 300° C. and then enters the cracking section;
   a temperature of the pressurized catalytic cracking reaction is 450 to 700° C., a pressure is 3 to 9 MPa, a mass ratio of the coke powder to heavy oil feedstock is 4 to 20, a reaction time is 1 to 20 seconds, and a superficial gas velocity is 1 to 20 m/s.

9. The method according to claim 2, wherein the heavy oil feedstock is preheated to 220 to 300° C. and then enters the cracking section;
   a temperature of the pressurized catalytic cracking reaction is 450 to 700° C., a pressure is 3 to 9 MPa, a mass ratio of the coke powder to heavy oil feedstock is 4 to 20, a reaction time is 1 to 20 seconds, and a superficial gas velocity is 1 to 20 m/s.

10. The method according to claim 1, wherein a temperature of the gasification reaction is 850 to 1200° C., a pressure is 3 to 9 MPa, and a superficial gas velocity is 0.1 to 5.0 m/s; a residence time of coke powder that is carrying the coke is 1 to 20 min; and the gasification agent is selected from oxygen-containing gas and/or vapor.

11. The method according to claim 2, wherein a temperature of the gasification reaction is 850 to 1200° C., a pressure is 3 to 9 MPa, and a superficial gas velocity is 0.1 to 5.0 m/s; a residence time of coke powder that is carrying the coke is 1 to 20 min; and the gasification agent is selected from oxygen-containing gas and/or vapor.

12. The method according to claim 1, wherein the coke is carried downward by the coke powder, after being subjected to a stream stripping, the coke enters the gasification section; wherein a mass ratio of vapor to the feedstock oil is 0.1 to 0.3:1, a temperature of vapor is 200 to 400° C., and a superficial gas velocity of vapor is 0.5 to 5.0 m/s.

13. The method according to claim 1, wherein further comprising a step of supplying a gasification catalyst to the gasification section.

14. An apparatus for integrating pressurized hydrocracking of heavy oil and coke gasification, configured to implement the method according to claim 1, the apparatus comprises at least a coupled reactor, a gas-solid separator and a fractionating tower, wherein:
   the coupled reactor has a cracking section in an upper portion and a gasification section in a lower portion, and the cracking section and the gasification section are internally connected with each other;
   the cracking section has a feedstock oil inlet, an oil-gas outlet, a regenerated coke powder inlet and a first-stage solid particle inlet; and the gasification section has a gasification agent inlet, a regenerated coke powder outlet and a second-stage solid particle inlet;
   the gas-solid separator comprises a first-stage gas-solid separator and a second-stage gas-solid separator, and both the first-stage gas-solid separator and the second-stage gas-solid separator have a feedstock inlet, a gas outlet, and a solid outlet;
   the oil-gas outlet of the cracking section is connected with the feedstock inlet of the first-stage gas-solid separator, the gas outlet of the first-stage gas-solid separator is connected to the feedstock inlet of the second-stage gas-solid separator, and the solid outlet of the first-stage gas-solid separator is connected with the first-stage solid particle inlet of the cracking section, the solid outlet of the second-stage gas-solid separator is connected with the second-stage solid particle inlet of the gasification section, the regenerated coke powder outlet of the gasification section is connected with the regenerated coke powder inlet of the cracking section, and the gas outlet of the second-stage gas-solid separator is connected with a feedstock inlet of the fractionating tower.

* * * * *